(12) United States Patent
Yoshida

(10) Patent No.: US 8,647,060 B2
(45) Date of Patent: Feb. 11, 2014

(54) HORIZONTAL AXIS WIND TURBINE

(75) Inventor: Shigeo Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 13/152,311

(22) Filed: Jun. 3, 2011

(65) Prior Publication Data
US 2011/0299998 A1 Dec. 8, 2011

(30) Foreign Application Priority Data
Jun. 8, 2010 (JP) .................................. 2010-130581

(51) Int. Cl.
*F03D 7/02* (2006.01)
(52) U.S. Cl.
USPC .......... 416/9; 416/169 R; 416/170 R; 416/174
(58) Field of Classification Search
USPC ............ 416/1, 9, 10, 110, 169 R, 170 R, 174, 416/246; 290/44, 55
See application file for complete search history.

(56) References Cited

U.S. PATENT DOCUMENTS

| 6,945,752 B1 * | 9/2005 | Wobben ................. 416/170 R |
| 2009/0232652 A1 * | 9/2009 | Keller et al. ................. 416/1 |

FOREIGN PATENT DOCUMENTS

JP 2001-289149 10/2001

* cited by examiner

*Primary Examiner* — Christopher Verdier
(74) *Attorney, Agent, or Firm* — Crowell & Moring LLP

(57) ABSTRACT

This horizontal axis wind turbine comprises a plurality of yaw motors that are provided on one of either a nacelle or a tower, and a gear 2 that is provided on the other of either the nacelle or the tower and that engages with the drive gears 4m, 4n of the plurality of yaw motors, such that when the plurality of yaw motors stop the rotation of the nacelle, some of the yaw motors are stopped and held by yaw motor brakes, then after a delay, the other yaw motors are stopped and held by yaw motor brakes. When the other yaw motors are stopped, the drive gears 4m of the some yaw motors and the drive gears 4n of the other yaw motors hold the gear 2 by pressing against the gear 2 in opposite directions of rotation.

4 Claims, 6 Drawing Sheets

HORIZONTAL AXIS WIND TURBINE

CROSS REFERENCE TO RELATED APPLICATION

This application claims priority under 35 U.S.C. 119 based upon Japanese Patent Application Serial No. 2010-130581, filed on Jun. 8, 2010. The entire disclosure of the aforesaid application is incorporated herein by reference.

FIELD OF THE INVENTION

The present invention relates to gear backlash prevention in a yaw rotation mechanism of a horizontal-axis wind turbine.

BACKGROUND OF THE INVENTION

Typically, a horizontal axis wind turbine comprises a rotor to which one, two or more blades are attached radially from a hub, a nacelle which rotatably supports the rotor by means of supporting a main shaft of the rotor which extends in the horizon and to which the hub is fixed, and a tower that supports the nacelle such that there is a free yaw rotation.

As a typical yaw rotation drive mechanism there is a drive mechanism in which the top section of the tower and the nacelle are linked by a yaw bearing having a yaw axis as the axis of rotation, an inner-teeth ring gear is attached to the inner race that is fastened on the tower side of the yaw bearing, a yaw motor is located on the nacelle, a pinion gear that is fastened to the drive shaft of the yaw motor engages with the ring gear, and by driving and rotating the yaw motor, the nacelle is rotated around the yaw axis. With this mechanism, the yaw angle of the nacelle is controlled so that the nacelle, and thus the rotor faces in a desired direction such as the direction of the incoming wind (for example, refer to Japanese Patent Publication No. 2001-289149).

Not only does the wind speed change with respect to the wind turbine, but also turbulence such as sudden crosswinds, blowing upward from underneath, or blowing downward from above occurs. These have a large effect on the operation of the wind turbine.

When turbulent wind occurs, swinging motion of the nacelle occurs due to backlash in the ring gear on the tower side and yaw gear on the nacelle side. Swinging motion of the nacelle could be a cause of damage to the yaw gear, yaw motor, rotor and the like.

SUMMARY OF THE INVENTION

Taking into consideration the related technology described above, an object of the present invention is to provide a horizontal axis wind turbine that is capable of preventing gear backlash in a yaw rotation mechanism by driving and controlling a plurality of yaw motors.

According to a first embodiment of the present invention for achieving the purpose described above, there is provided a horizontal axis wind turbine, comprising:

a main wind turbine unit;

a tower holding the main wind turbine unit rotatably in a substantially horizontal direction; and a drive mechanism located between the main wind turbine unit and the tower, configured to rotate the main wind turbine unit relative to the tower in the horizontal direction, wherein the drive mechanism, comprises:

a ring gear fixed to one of the tower and the main wind turbine unit;

a plurality of pinion gears for engaging with the ring gear;

a plurality of motors, each of the motors being fixed to a respective pinion gear, configured to rotate the main wind turbine unit relative to the tower by driving the pinion gears, said plurality of motors being fixed to the other of the tower and main wind turbine unit; and a controller connected to each of the motors, for controlling the motors, wherein the controller, when stopping a rotation of the main wind turbine unit, stops some of the motors, and then stops the rest of the motors after a specified amount of time.

According to a second embodiment of the present invention for achieving the purpose above, there is provided the horizontal axis wind turbine according to the first embodiment, wherein the drive mechanism further comprises a plurality of brakes, each provided on a respective motor, for holding a drive shaft of each of the motors from rotating, and wherein the controller is connected to each of the brakes, and controls the brakes so that the drive shafts of the some of the motors are held from rotating when the some of the motors are stopped, and the drive shafts of the rest of the motors are held from rotating when the rest of the motors are stopped.

According to a third embodiment of the present invention for achieving the purpose described above, there is provided the horizontal axis wind turbine apparatus according to the first embodiment, wherein the controller, after stopping the rest of the motors, controls the plurality of motors so that each pinion gear of the some of the motors presses the ring gear toward one direction of rotation of the main wind turbine unit, and each pinion gear of the rest of the motors presses the ring gear toward the other direction of rotation of the main wind turbine unit.

With the present invention, when driving the nacelle in the yaw direction using a plurality of yaw motors, and rotation is stopped, firstly some of the yaw motors are stopped, and then after a delay the remaining yaw motors are stopped. Therefore, teeth surfaces on opposite sides from each other of the pinion gears of some of the yaw motors and the pinion gears of the other yaw motors come in contact with a common gear, and spaces between teeth, which are caused by backlash, are eliminated. As a result, gear backlash in the yaw rotation mechanism can be prevented.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
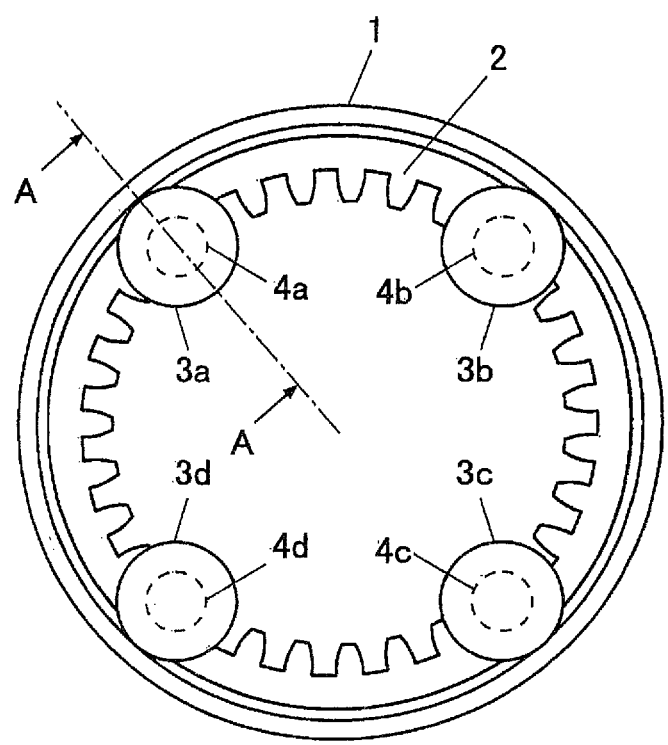
FIG. 1 is a top view of the linkage unit between the tower and nacelle of a horizontal axis wind turbine of an embodiment of the present invention.

In the following, an embodiment of the present invention is explained with reference to the accompanying drawings. The following is one embodiment of the present invention and does not limit the invention.

The horizontal axis wind turbine of the present invention, as in the case of a conventional horizontal-axis wind turbine, has a rotor 8 to which one or two or more blades 8a are radially attached on the hub 8b, a nacelle 5 which rotatably supports the rotor 8 by means of supporting a main shaft 8c of the rotor 8 which extends in the horizontal direction and to which the hub 8b is fixed, and a tower 6 that supports the nacelle 5 so that there is a free yaw rotation between the nacelle 5 and the tower 6.

Figure 2:
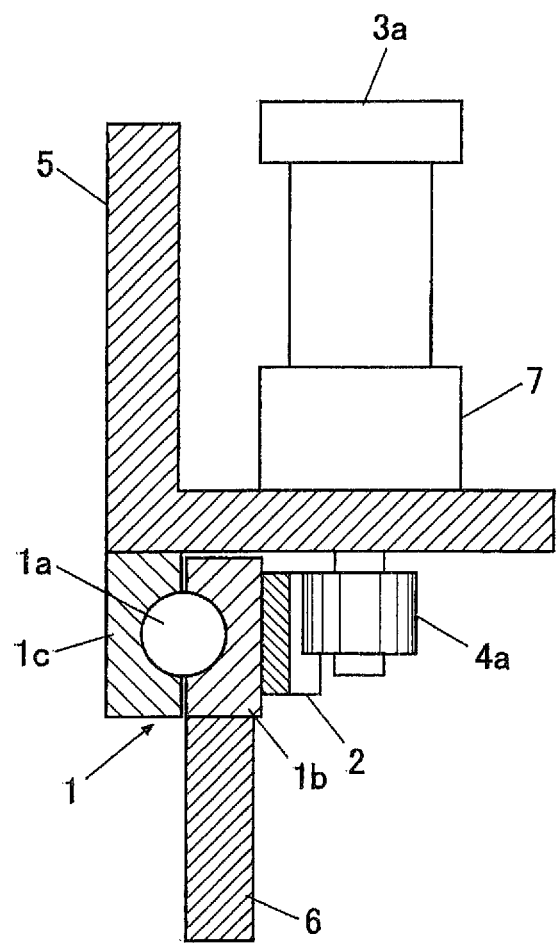
FIG. 2 is a cross-sectional drawing of section A-A in FIG. 1.

As illustrated in FIG. 1 and FIG. 2, in the horizontal axis wind turbine of this embodiment, in order to support the nacelle 5 by the top section of the tower 6 such that nacelle 5 has the free yaw rotation, the nacelle 5 and tower 6 are linked by way of a yaw bearing unit 1.

As illustrated in FIG. 2, the yaw bearing unit 1 comprises a bearing 1a, and an inner race 1b and outer race 1c for supporting the bearing 1a.

By fastening the inner race lb to the tower 6 and fastening the outer race 1c to the nacelle 5, the tower 6 and nacelle 5 are linked so that there is said free rotation. The axis of rotation of the yaw bearing unit 1 is the yaw axis of the nacelle 5, and an internal-teeth ring gear 2 is fastened on the inside of the inner race 1b coaxially with the yaw axis.

As illustrated in FIG. 1, there are four yaw motors 3a, 3b, 3c and 3d in the horizontal axis wind turbine. A vertical cross-sectional view of the construction of yaw motor 3a is illustrated in FIG. 2 as a representative motor. The four yaw motors 3a, 3b, 3c and 3d all have the same construction.

In other words, the frames of the four yaw motors 3a, 3b, 3c and 3d are fastened to locations in the nacelle 5. As illustrated in FIG. 2, a pinion gear 4a (4b, 4c, 4d), which is the driving gear of the yaw motor 3a (3b, 3c, 3d), engages with the ring gear 2. A reduction gear 7 is mounted between the yaw motor 3a (3b, 3c, 3d) and the pinion gear 4a (4b, 4c, 4d).

By rotating and driving the yaw motors 3a, 3b, 3c and 3d in the same direction, yaw rotation of the nacelle 5 can be performed.

Yaw motor brakes are mounted in the yaw motors 3a, 3b, 3c and 3d.

In order to simplify the explanation, the case of driving yaw rotation of the nacelle using two yaw motors will be explained while referencing FIGS. 3A to 3C and FIGS. 4A to 4D. In FIGS. 3A to 3C and FIGS. 4A to 4D, in order to simplify the explanation, the ring gear 2 is drawn linearly, and teeth other than the teeth of the pinion gears 4m, 4n of the two yaw motors are omitted from the drawing.

Figure 3A:
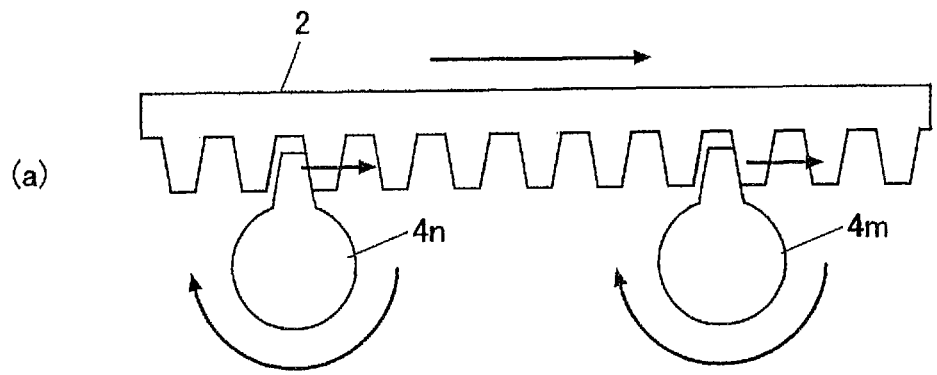
FIGS. 3A to 3C are schematic diagrams of the operating state and illustrate the operation when stopping yaw rotation of the nacelle of a comparative example.
Figure 3B:
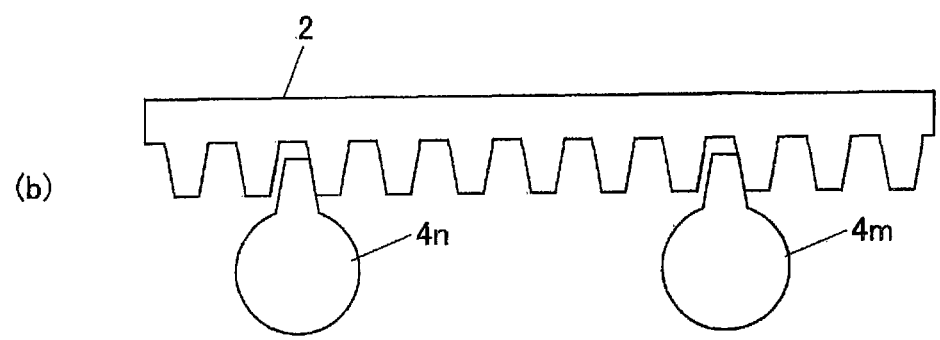
Figure 3C:
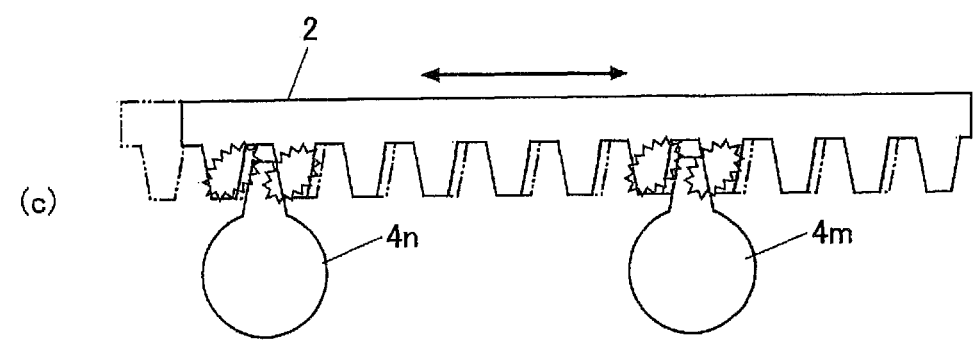

As illustrated in FIG. 3A, while two pinion gears 4m, 4n are simultaneously rotated and driven by the respective yaw motors, and the rotation of these two yaw motors, and thus the rotation of the pinion gears 4m, 4n is simultaneously stopped and held so as not to rotate by the yaw motor brakes, as illustrated in FIG. 3B, rotation is stopped with the pinion gears 4m, 4n contacting with the tooth surfaces in the same direction of the ring gear 2. On the opposite sides from the contact surfaces of the teeth, a space occurs between the teeth, which becomes the cause of backlash. Therefore, as illustrated in FIG. 3C, this space is the fluctuating width, and the ring gear 2 fluctuates back and forth relative to the pinion gears 4m, 4n due to external disturbance. In other words, backlash occurs. In this case, swinging motion of the nacelle occurs due to the gear backlash in the yaw rotation mechanism, and thus there is a possibility that the gears, yaw motors, rotor and the like could be damaged.

Control for stopping yaw rotation of the nacelle of this embodiment is performed as described below.

Figure 4A:
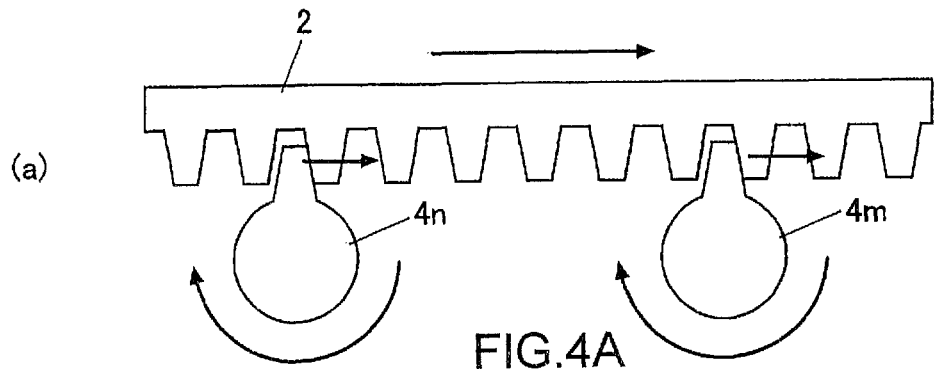
FIGS. 4A to 4D are schematic diagrams of the operating state, and illustrate the operation when stopping yaw rotation of the nacelle of an embodiment of the present invention.
Figure 4B:
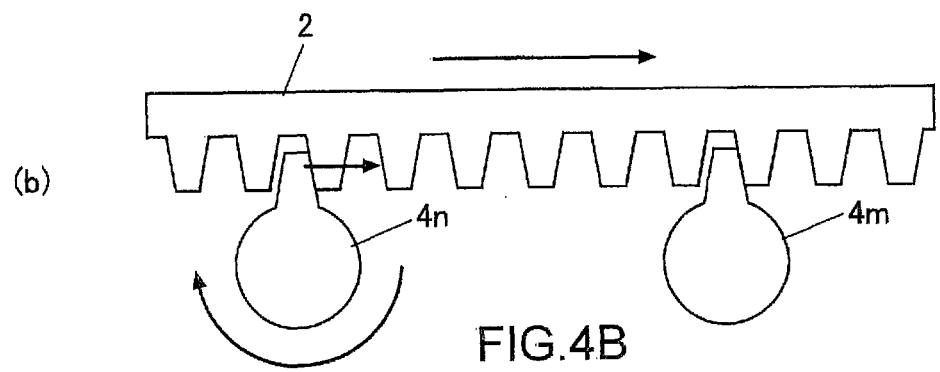
Figure 4C:
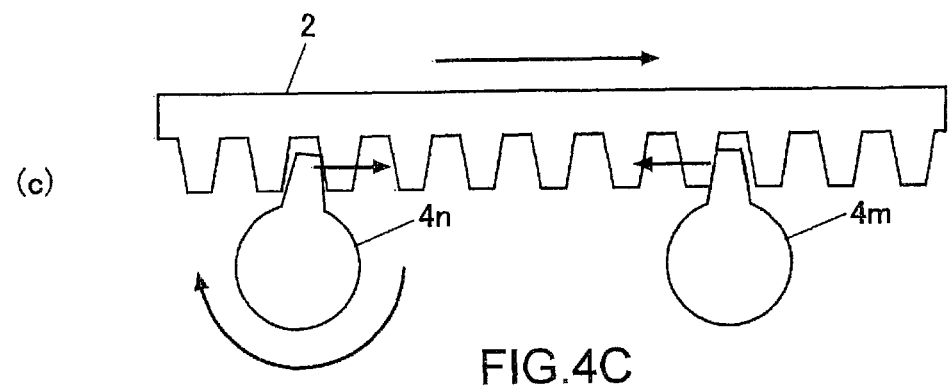

As illustrated in FIG. 4A, while the two pinion gears 4m, 4n are simultaneously being rotated and driven by the yaw motors, first the rotation of one of the yaw motors is stopped, or in other words, the rotation of the pinion gear 4m is stopped, and rotation is prevented by the yaw brake (see FIG. 4B). At this instant, rotating and driving the other yaw motor, or in other words, rotating and driving the pinion gear 4n continues. Therefore, as time elapses, the tooth of the ring gear 2 which is rotated by the power from the pinion gear 4n comes into contact with the stopped pinion gear 4m.

Figure 4D:
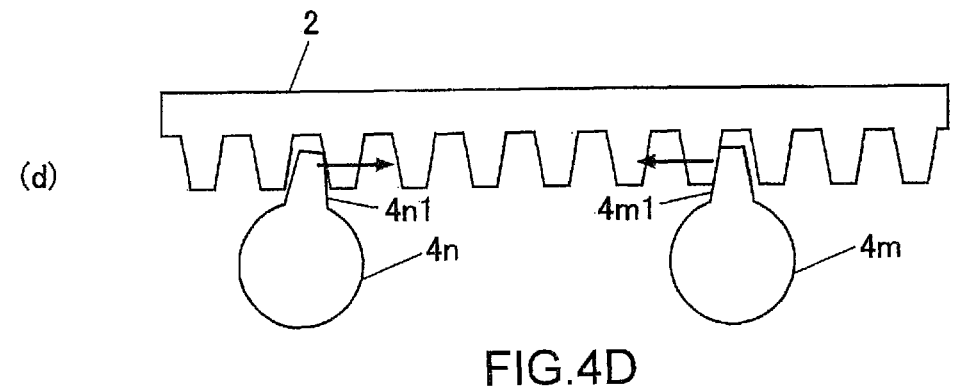
Figure 5A:
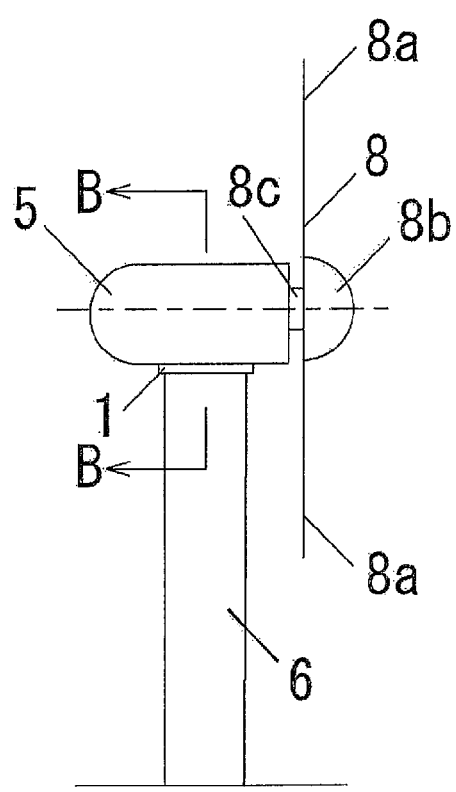
FIGS. 5A and 5B are schematic diagrams of the horizontal axis wind turbine of the embodiment of the present invention.
Figure 5B:
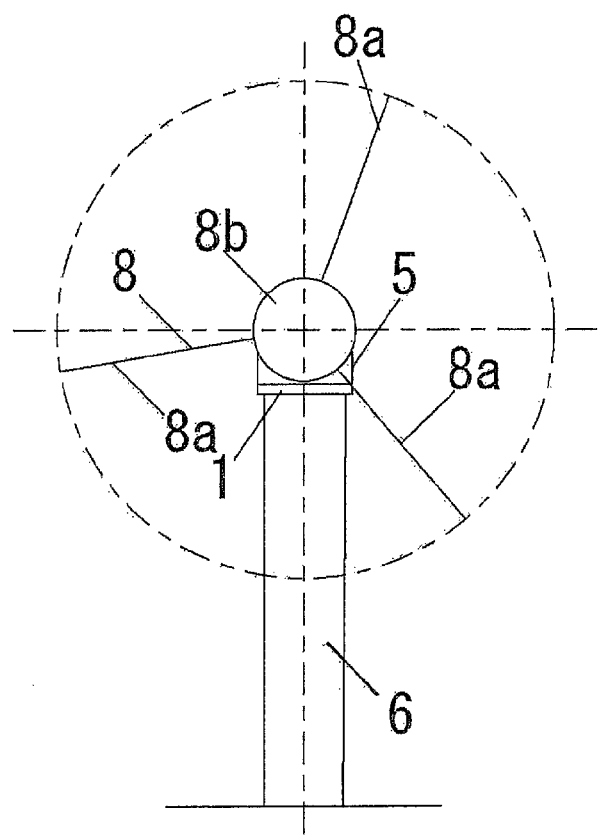
Figure 6:
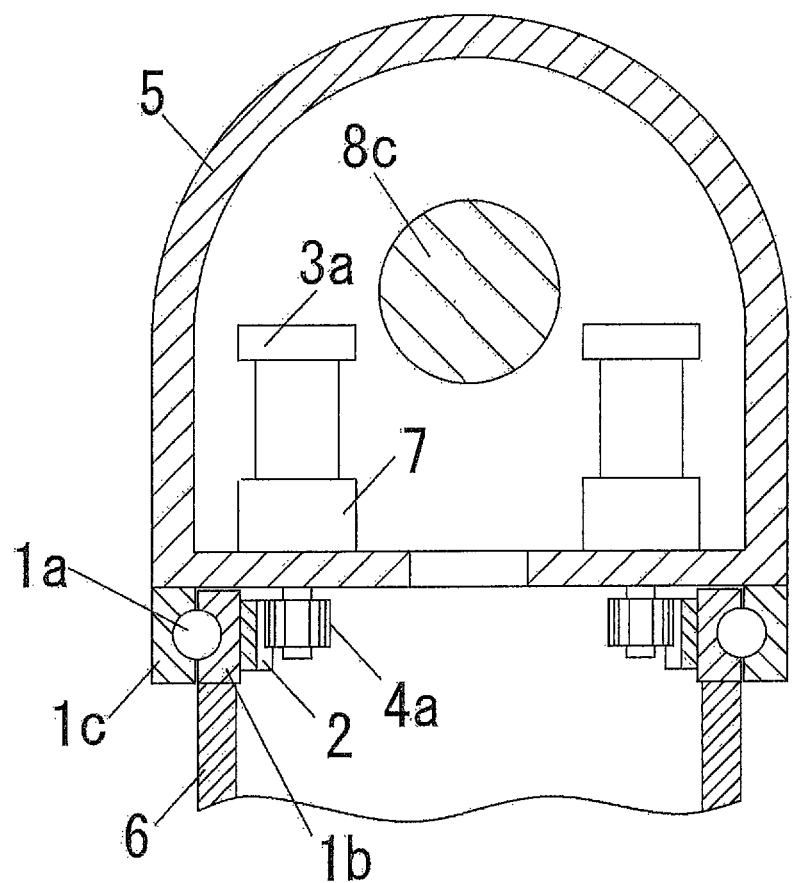
FIG. 6 is a cross-sectional drawing of section B-B in FIG. 5A.

Being delayed from the point in time when rotation of the one yaw motor is stopped, at the time when both the pinion gear 4m and pinion gear 4n press the teeth of the ring gear 2, rotation of the other yaw motor, in other words, rotation of the pinion gear 4n is stopped, and rotation of the pinion gear 4n is prevented by the yaw motor brake (FIG. 4D).

As a result of the above, the tooth surface 4m1 of the pinion gear 4m and the tooth surface 4n1 of the pinion gear 4n that is in the opposite direction in the direction of rotation of the ring gear 2 from the tooth surface 4m1 are pressed to the teeth of ring gear 2 as illustrated in FIG. 4D, and the ring gear 2 is held. That is, the ring gear 2 receives the loads from the pinion gear 4m and pinion gear 4n that are in the opposite direction from each other and is held. As a result, backlash is prevented.

Control for stopping yaw rotation of the nacelle that was explained above with reference to FIGS. 4A to 4D is applied to the four yaw motors 3a, 3b, 3c and 3d illustrated in FIG. 1. Yaw motor 3a and 3c are stopped first, after which yaw motors 3b and 3d are stopped, or yaw motors 3a and 3b are stopped first, after which yaw motors 3c and 3d are stopped. In doing so, backlash is prevented. Therefore, damage to the ring gear 2, yaw motor 3, pinion gear 4, reduction gear 7, rotor and the like caused by backlash is prevented. When there is an even number of yaw motors, preferably the number of yaw motors that are stopped first will be the same as the number of yaw motors stopped later. When there is an odd number of yaw motors, preferably the difference in the number of the yaw motors stopped first and the number of yaw motors stopped later will be one. This is in order to increase the holding force.

In the embodiment described above, the yaw motors were fastened to the nacelle, and the gear (ring gear 2) that engages with the drive gears (pinion gears 4) of the yaw motors are fastened to the tower, however, it is also possible to fasten the yaw motors to the tower and to fasten the gear that engages with the drive gears of the yaw motors to the nacelle. The latter construction can be achieved by fastening the inner race of the yaw bearing to the nacelle, and fastening the outer race to the tower.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:
1. A horizontal axis wind turbine, comprising:
a main wind turbine unit;
a tower holding the main wind turbine unit rotatably in a substantially horizontal direction; and a drive mechanism located between the main wind turbine unit and the tower, configured to rotate the main wind turbine unit relative to the tower in the horizontal direction, wherein the drive mechanism, comprises:

a ring gear fixed to one of the tower and the main wind turbine unit;

a plurality of pinion gears for engaging with the ring gear;

a plurality of motors, each of the motors being fixed to a respective pinion gear, configured to rotate the main wind turbine unit relative to the tower by driving the pinion gears, said plurality of motors being fixed to the other of the tower and main wind turbine unit; and a controller connected to each of the motors, for controlling the motors, wherein the controller, when stopping a rotation of the main wind turbine unit, stops some of the motors, and then stops the rest of the motors after a specified amount of time.

2. The horizontal axis wind turbine according to claim 1, wherein the drive mechanism further comprises a plurality of brakes, each provided on a respective motor, for holding a drive shaft of each of the motors from rotating, and wherein the controller is connected to each of the brakes, and controls the brakes so that the drive shafts of the some of the motors are held from rotating when the some of the motors are stopped, and the drive shafts of the rest of the motors are held from rotating when the rest of the motors are stopped.

3. The horizontal axis wind turbine according to claim 1, wherein the controller, after stopping the rest of the motors, controls the plurality of motors so that each pinion gear of the some of the motors presses the ring gear toward one direction of rotation of the main wind turbine unit, and each pinion gear of the rest of the motors presses the ring gear toward the other direction of rotation of the main wind turbine unit.

4. The horizontal axis wind turbine according to claim 2, wherein the controller, after stopping the rest of the motors, controls the plurality of motors and the brakes so that each pinion gear of the some of the motors presses the ring gear toward one direction of rotation of the main wind turbine unit, and each pinion gear of the rest of the motors presses the ring gear toward the other direction of rotation of the main wind turbine unit.

* * * * *